COMPOSITE IMAGE REPRODUCING MEANS

Filed Sept. 28, 1960 2 Sheets-Sheet 1

INVENTORS
FRANK J. BINGLEY
JOSEPH F. FISHER
BY
Robert D. Sanborn
ATTORNEY

Dec. 3, 1963 F. J. BINGLEY ETAL 3,113,180

COMPOSITE IMAGE REPRODUCING MEANS

Filed Sept. 28, 1960 2 Sheets-Sheet 2

INVENTORS
FRANK J. BINGLEY
JOSEPH F. FISHER
BY Robert D. Sanborn
ATTORNEY 3,113,180
Patented Dec. 3, 1963

3,113,180

COMPOSITE IMAGE REPRODUCING MEANS

Frank J. Bingley, Meadowbrook, and Joseph F. Fisher, Wynnewood, Pa., assignors, by mesne assignments, to Philco Corporation, Philadelphia, Pa., a corporation of Delaware Filed Sept. 28, 1960, Ser. No. 59,065
15 Claims. (Cl. 178—6.8)

This invention relates to a novel television system and in particular to a television system for producing a composite image corresponding generally to the characteristics of the image produced in the human eye.

It is well known that the number of resolvable picture elements, i.e. the apparent detail, in a televised scene is determined by the frame rate and the bandwidth of the transmitted signal. The lower limit of the frame rate is the minimum rate which will prevent objectionable flicker.

In certain industrial and military television applications it is desirable to transmit a television picture of a relatively large area in which selected small areas of prime interest are displayed in relatively fine detail. If the entire picture area is transmitted in this fine detail a relatively wide frequency band is required. Furthermore the detail present in areas of secondary interest may tend to distract the eye of the viewer from the details presented in the area of prime interest. The ideal image in many instances would be an image having resolution capabilities similar to that possessed by the retina of the human eye, namely one in which the central portion of the televised scene is reproduced in greater visible detail than the outer portion of the scene. Such a system would be useful in minutely examining a great mass of relatively small objects, for example. Similarly in military applications it would be useful to obtain a representation of a televised scene encompassing a relatively large total area which could first be scrutinized to ascertain the location of a particular object of interest. Once having located said object, the position of the television camera could then be shifted to move the object of interest into the center of the raster where its characteristics could be observed in greater detail.

While systems in the past may have been partially successful in presenting a composite image in which one area thereof is presented in more detail than the other areas thereof, such systems were inexact analogs of the human eye. The image formed by the eye has what may be termed geometrical integrity or fidelity. That is, the eye reproduces the scene as an integrated whole in which more detail is discernible in the central portion than in the outer portion and yet the central portion is not magnified out of proportion to the other portions of the scene. The prior art systems did not preserve the geometrical integrity or fidelity of the original scene. Commonly, in such prior art systems, the central portion (or the portion intended to show more detail) was reproduced in such a fashion that it was magnified relative to the other portions with the result that it did not "fit" properly into the overall picture.

It is an object of the present invention to provide a novel television system for producing a composite reproduced image which approximates the characteristics of human vision.

It is another object of the invention to provide a novel television system in which the reproduced image will encompass a relatively large field, selected portions of which will contain more detail information than other portions thereof.

Another object of the invention is to provide a novel television system for producing a composite reproduced image which contains a high-definition central portion and a relatively low-definition peripheral portion, both portions being integrated with complete geometric integrity.

These objects as well as others which will appear are obtained, according to our invention in one of its forms, by providing different optical inputs to a television camera tube on alternate fields. For example, on odd-numbered fields a first optical image of a relatively large area of the scene to be televised will be formed on the light-sensitive surface of the camera tube. During even-numbered fields a second image of the same size as the first image but corresponding to a smaller area of the scene than that represented by the first image will be focused on the light-sensitive surface of the camera tube. Since the number of resolvable elements will be the same for the two images each resolvable element of the first image represents a larger area of the original scene than a resolvable element of the second image. In practice the first image may be obtained by way of a first optical path which includes a lens system which presents a wide field image of the overall scene, and the second image may be obtained by way of a second optical path which includes a second lens system which presents an enlarged, narrow field view of the central portion of the scene. The camera develops, in alternate fields, electrical signals corresponding to the two types of images. These electrical signals may be transmitted by conventional means to a receiver which is provided with two cathode ray display tubes. The first tube presents the odd field image; the second presents the even field image. However the even field image, which is made up of the same number of scanning lines as the odd field image, is made smaller than the other image either by employing a smaller raster or by optically reducing a large raster. The reduced even field image is then optically combined with the odd field image to present to the observer a unified composite image. While the two portions of the image are displayed in different detail, these two portions are integrated with complete geometric fidelity.

In another form of the invention, two camera tubes with different focal length lenses may be employed to produce the signals representative of the wide field and narrow field images. The two images displayed by the cathode ray tubes, associated with each of the cameras, are ultimately recombined optically in the same manner as in the first system.

For a better understanding of the present invention together with other and further objects thereof reference should now be made to the following detailed description which is to be read in conjunction with the accompanying drawings in which.

Figures 1, 1A:
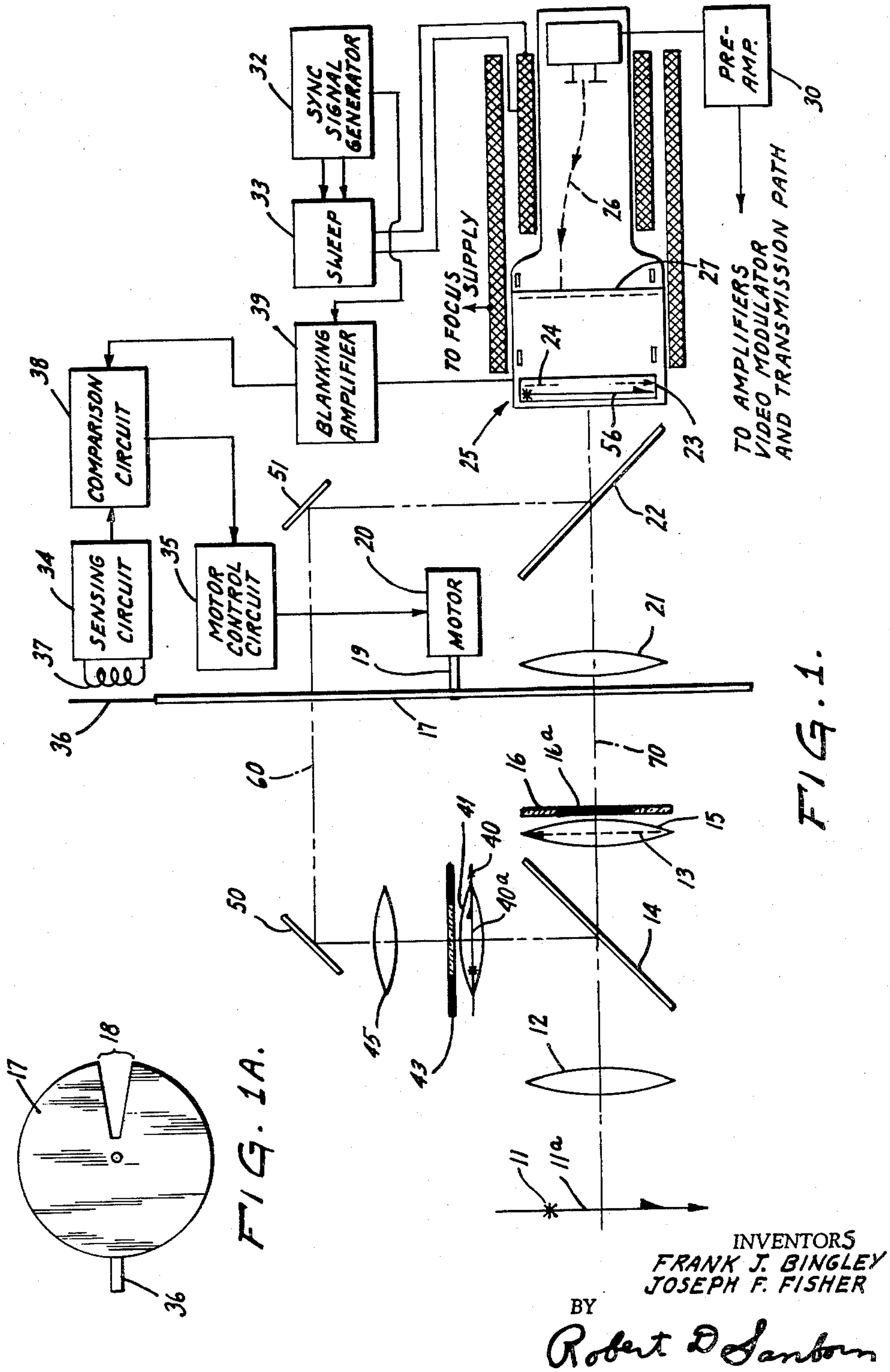
FIG. 1 is a schematic block diagram, partially in section, of a transmitter according to one form of our invention.
Figure 2:
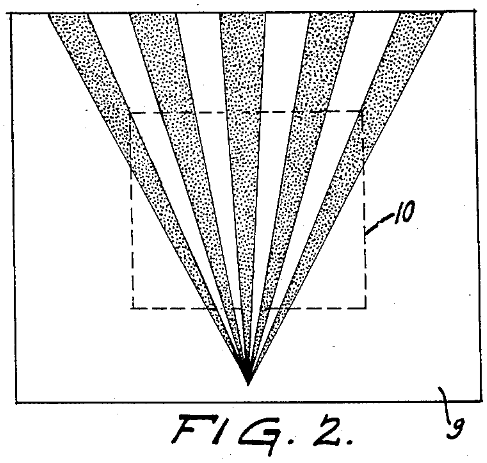
FIG. 2 represents a test pattern useful in demonstrating the operation of the invention.

Referring to FIG. 1 the functioning of the first optical path, indicated by broken line 70, will first be considered. By way of example, the object 11 to be televised may be a placard containing the test pattern shown in FIG. 2. The object 11 is imaged at 13 by a lens indicated symbolically at 12. Mirror 14 through which the light rays pass is a partially reflective mirror which lets a portion of the incident light pass therethrough to form the image 13. Image 13 is a real image. A field lens 15 is placed in the plane of image 13 in order to direct all of the light rays which pass through lens 12 to lens 21. Field lens 15 may be a conventional double convex lens of proper focal length to image lens 12 on lens 21.

Figure 3:
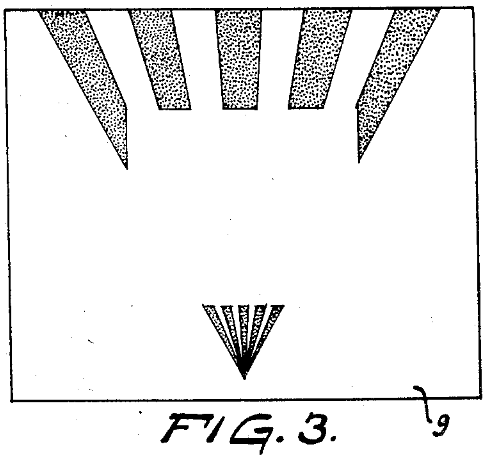
FIGS. 3 and 4 show the images produced on the camera tube during odd and even-numbered fields, respectively.

Associated with lens 15 is a transparent sheet 16 of glass or other material having a central rectangular opaque portion $16^a$. The purpose of this opaque section is to prevent the image of central rectangular portion 10 (FIG. 2) of the test pattern from being applied to the camera tube 25 by way of lens 21 for reasons which will be explained below. Rays of light from the image 13 pass through the transparent portions of sheet 16 to disc 17. The disc 17, which is opaque except for the sector 18 (FIG. 1A), is fastened to a shaft 19 of a motor 20. The disc 17 revolves so that the transparent sector 18 is alternately in the path of the rays following the optical path 70 from field lens 15, and in the path of rays following optical path 60 from lens 45. Mirror 22 is partially reflective. This permits a selected fraction of the light following path 70 to pass therethrough. The lens indicated symbolically at 21 focuses the rays following path 70 onto the photocathode 23 of the camera tube 25. The dashed-line arrow 24 represents the image formed in the plane of the photocathode 23. The central portion of arrow 24 is omitted to illustrate that the central portion of the image is blocked by opaque area $16^a$. The image formed on photocathode 23 by lens systems 12 and 21 is shown in FIG. 3. The tube 25, in the form illustrated, is an image orthicon. However other forms of camera tubes may be employed.

The relatively narrow sector 18 in disc 17 acts as a shutter which permits only a momentary projection of image 24 on the photocathode 23. Preferably this projection occurs during the vertical blanking interval. If, for example, a television system having a 500-line raster sequentially scanned in a non-interlaced fashion and having a frame rate of 120 per second is selected, this vertical blanking period may be about 600 microseconds in duration. For reasons which will appear presently, disc 17 is arranged to rotate at one half the frame rate, i.e., 60 revolutions per second, so that lens 21 projects an image on photocathode 23 only during alternate blanking intervals. During the approximately 8000 microsecond field interval which follows each vertical blanking interval during which the image is projected, the beam 26 scans the target 27, discharging the target and generating the desired video output signal. This video output signal is first applied to a conventional preamplifier 30 and thence to amplifiers, video modulators (if a carrier is used), and eventually to the transmission path which may be either wired or wireless.

The second and in many ways preferable means for forming an immobile image on target 27 is by electronically gating the photocathode. That is, sector 18 may be made relatively wide, for example nearly 180°, so that image 24 is formed on the photocathode 23 for an interval which is considerably longer than the vertical blanking interval. A relatively short duration pulse, for example, a pulse having a duration of 600 microseconds or less, is applied to the photocathode 23 of the image orthicon so that the photoelectrons which originate at the photocathode flow to the target only during the time that the photocathode 23 is pulsed. This method of gating the image orthicon has the advantage that more rapid turn-on and turn-off times can be obtained. Furthermore, less precise phasing of the disc 17 is required.

Figure 4:
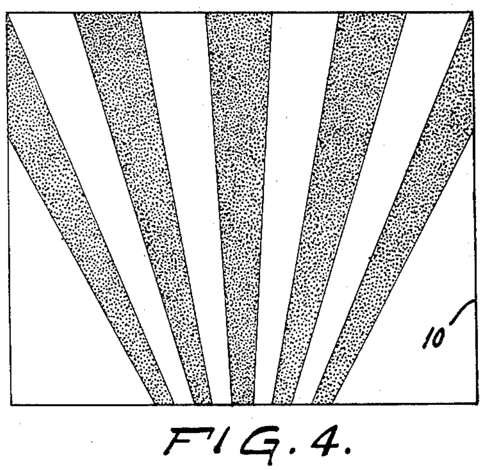

The operation of the optical system of FIG. 1 to produce the narrow field image will now be considered. Assume that the disc 17 has rotated 180° from its former position so that the sector 18 is now between mirrors 50 and 51. If the rate of rotation of disc 17 is one half the vertical blanking rate, this is the position that disc 17 will occupy during alternate vertical blanking intervals. The optical path indicated by the dashed line 60 is now of interest. A portion of the light from the object 11 which is projected by the lens 12 onto the partially silvered mirror 14 will be reflected by mirror 14 to form an image 40 in the plane of the field lens 41. Image 40 is the same size as the image 13 formed at lens 15. However only the central region $40^a$ of the image 40 which corresponds to the portion $11^a$ of object 11 lying between the half arrowhead and the asterisk is of interest. Therefore lens 41 may have a smaller diameter than lens 15. A light shield 43 having an opaque border and a transparent center may be provided for blocking light rays from the border areas of the image. The portion $40^a$ of image 40 which passes through the field lens 41 is projected by way of lens 45, totally reflective mirrors 50 and 51 and partially reflective mirror 22 to the photocathode 23. The image of the photocathode is represented as the solid arrow 56. The focal length of lens 45 is selected so that the image of the central portion $11^a$ of object 11 (FIG. 4) will occupy the entire area of the photocathode 23. As in the previous instance the beam 26 scans the target 27 during the frame interval which follows the blanking interval thereby producing at the output of the preamplifier 30 a signal corresponding to the scansion of the image 56 as shown in FIG. 4. Thus the high detail signal corresponding to the narrow field image and the low detail signal corresponding to the wide field image are automatically time multiplexed at the output of preamplifier 30.

It has been found that, in most instances, the wide field electrical charge image formed on target 27 will be erased sufficiently due to scanning by the time that the narrow field image is to be scanned so that no appreciable cross-talk between the two images exists.

The transmitter section of the system also includes a disc synchronization system to coordinate the camera action and the disc rotation. It includes a motor control circuit 35 which operates to govern the rotation speed of motor 20. For example, circuit 35 may be a D.-C. amplifier and motor 20 a D.-C. motor energized by the output of circuit 35. Alternatively the circuit 35 may be a magnetic clutch or brake. The variations in the speed of rotation of the disc 17 may be detected by employing, for example, a magnetic tab 36 which is affixed to disc 17 at some reference position such as approximately opposite the sector 18. This tab passes in the vicinity of the inductance 37 of the sensing circuit 34. This causes circuit 34 to supply a pulse to comparison circuit 38. Comparison circuit 38 may be a conventional phase discriminator, for example. The other input of comparator 38 is supplied with a pulse originating in the blanking amplifier 39. Any change in the relative occurrence times of the two pulses will produce a corresponding error voltage change in the output of circuit 38. This error signal is applied to control circuit 35. The blanking amplifier 39 itself is synchronized by the sync signal generator 32 which also controls the timing of the sweep circuits 33. Of course, any other well-known disc-synchronizing system may be employed, such as those used, for example, in sequential field-type color television.

Figure 6:
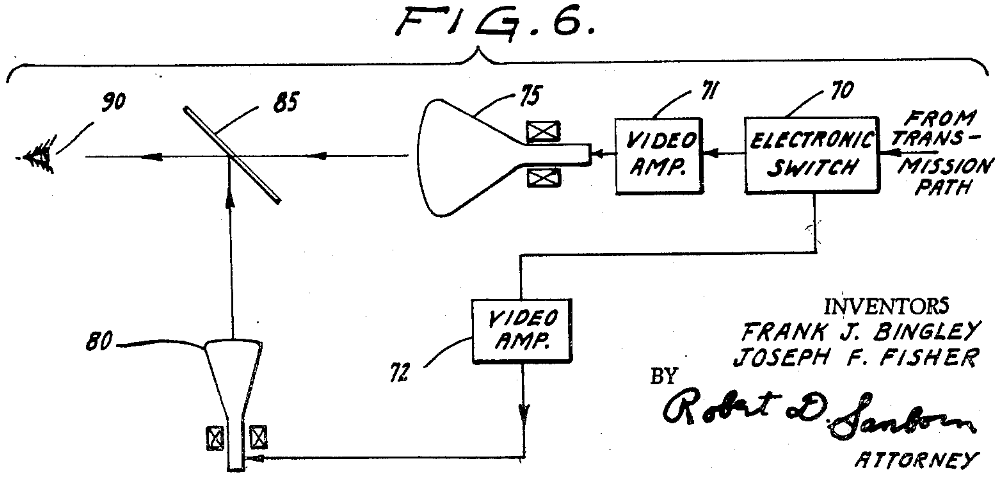
FIG. 6 is a schematic diagram of a receiver which will produce the composite image shown in FIG. 5.

The receiving system which corresponds to the transmitting system of FIG. 1 is shown in FIG. 6. It should be recalled that the output of the preamplifier 30 at the end of an odd field will consist of a signal comprised of odd field, wide-angle information and at the end of an even field a narrow field information signal which has more detail information about a selected portion of the scene than the odd field signal does. Assuming that the signal at the end of the transmission path consists of video signals having the above characteristics, it is evident that some means must be provided to separate the odd field information from the even field information. This may be done electronically by applying the signal at the end of the transmission path to an electronic switch 70 which applies the odd field video portions to the video amplifier 71 and the even field video portions to the video amplifier 72 which is coupled to the input of the cathode ray tube 80. The electronic switch 70 may be synchronized by arranging the vertical sync pulses in a manner which will uniquely identify the odd fields. A suitable decoding circuit at the receiver which is responsive to the coded vertical sync pulses may be employed to generate the control signal for switch 70. An example of this type of synchronizing system is found in the field-identification and switching systems formerly employed in the electromechanical field sequential color television broadcasting systems. Alternatively, a synchronizing pulse corresponding to the pulse generated by tab 36 on disc 17 may be transmitted along with the video signal. In such a system switch 70 may be a unistable multivibrator which is switched to its quasi-stable state by each received synchronizing pulse.

Figure 5:
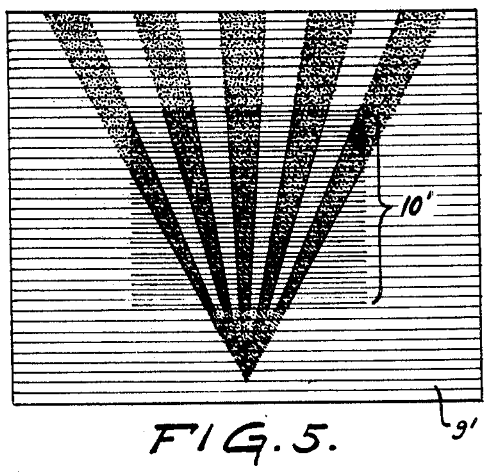
FIG. 5 shows the composite reproduced image having a central region of higher definition than the outer region.

The odd field information that is applied to the video amplifier 71 by switch 70 is presented on the screen of the tube 75, as shown in FIG. 6. This image is shown in FIG. 5 as the portion 9' which surrounds the central portion 10' of the raster. It will be noted that portion 9' differs from its counterpart 9 in FIG. 3 only insofar as it has the line structure and limited horizontal resolution resulting from the scanning by the television camera, the conversion into a video signal and the subsequent display on picture tube 75. It will be noted that, toward the lower central portion 9' of FIG. 5 where the five rays converge, it is practically impossible to distinguish the terminal portions of each of the rays as their edges are indistinct and appear to merge with one another because of the limitation imposed by the TV scanning process. There is a corresponding loss of detail in all areas of the image which is evidenced by the blurring of the edges of the rays.

The even field information from the output of the electronic switch 70 is applied through the video amplifier 72 to the electron gun of the small-screen tube 80. This information is, as will be recalled, derived from the scanning in camera tube 25 of the stored electrostatic image of the central portion 10 of the test pattern as shown in FIG. 4. Tube 80 produces an image as shown at 10' in FIG. 5. The raster which covers the reduced area 10' has the same number of lines as the raster which covers the larger area 9'. In such an embodiment of the receiver, tube 80 should have a smaller spot size than tube 75. These two factors will result in more detail information being recognizable in the reduced area 10' than is shown in the larger area 9'.

A semi-reflective mirror 85 is positioned so that, as seen by a viewer at 90, the image on the screen of tube 75 is superimposed on the image on the screen 80. The images are superimposed in the relationship shown in FIG. 5. Horizontal and vertical size and position controls (not shown) may be associated with one or both of display tubes 75 and 80 to adjust the two images so that they are superimposed with complete geometrical integrity or fidelity. The two tubes 75 and 80 may be deflected by horizontal and vertical deflection generators each respectively having at least some circuits in common, to reduce the overall complexity of the system. The two images which are superimposed should be equidistant from the center of mirror 85 if parallax is to be avoided.

Inspection of FIG. 5 reveals that the edges of the respective rays in the portion 10' are clearly defined and do not merge even when extremely close to one another. Thus the observer 90 will see a composite image as shown in FIG. 5 in which the central portion 10' has greater definition than the portion 9' and fits substantially exactly together with the portion 9' to reproduce the geometrical and positional characteristics of the televised scene with fidelity.

It will be seen that the system just described succeeds in being an analog of the characteristics of the human eye. One of its advantages, however, is not immediately apparent. That is, in industrial television systems, for example, the maximum permissible or transmissible frequency is not always as high as desired to ensure adequate reproduction of the fine detail of the entire scene such as scene 9 of FIG. 2. By using the foregoing system, fine detail in the unrestricted area 10 may be transmitted along with adequate background detail in the larger area 9 with a four-to-one increase in bandwidth over that required to transmit the entire scene with low resolution. This is substantially less than the bandwidth required to transmit the entire scene in fine detail. Consequently, this permits an industrial television system to scan a wide field but also permits the cameraman to examine a selected area, e.g. the central area, of the televised scene in great detail without increasing the upper frequency limit unduly.

The application of the system to military and industrial uses is believed to be apparent from the foregoing description. The invention could be employed, for example, in a closed circuit system for the remote surveillance of a factory yard and gate. The camera tube may be pointed directly at the gate so that the gate is displayed in the central area of the raster, that is, the area corresponding to area 10' of FIG. 5. The yard area displayed in area 9' would then be depicted in sufficient detail to permit the observer to detect the presence of persons in the area. The added detail in the central area 10' would permit the observer to ascertain the identity of persons in the immediate vicinity of the gate.

If it is not convenient to use a time-sharing system as shown in FIGS. 1 and 6 and if double channels are available, one can employ two camera tubes for developing two sets of simultaneous signals which are transmitted and reproduced simultaneously as a composite image substantially in the manner taught herein except that the switching system and the scanning disc features thereof will not be needed.

As another alternative tubes 75 and 80 may be of the same size and have the same size rasters. The apparent size of the raster on tube 80 would then be reduced by suitable optical means.

Another alternative would be to employ a single camera having a telephoto and wide-angle lens in an intermittent mechanical arrangement (such as a Geneva motion) which sequentially rotates the two lenses in front of the camera input at the field rate.

Of course, it may not be necessary to use the plate 16 having an opaque portion $16^a$ if, instead, the central portion of the screen of display tube 75 is covered with an opaque mask, or is not coated with phosphor in the central region thereof, or if the central portion of the screen of tube 75 is masked by using electronic blanking.

Still other modifications may be made without in any way departing from the essence of the invention. Consequently we desire that the scope of our invention be defined solely by the claims herein.

What is claimed is:

1. A television system comprising: means for developing a first electrical signal corresponding to the central portion of a scene to be televised, means for developing a second electrical signal corresponding to the remaining outer portion of said scene, said first signal-developing means being constructed and arranged so that said first signal includes more detail information than said second signal, means responsive to said first and second signals for producing first and second luminous images whose detail respectively corresponds to said first and second signals, and means for combining said first and second luminous images into a composite image wherein said first image fits in the center of said second image substantially imperceptibly, said first and second image portions of said composite image reproducing the positional and geometric characteristics of the elements of said scene faithfully.

2. A television system comprising: a single transducing means for converting light input to electrical signal output, means for applying an optical image of a first portion of a scene to be televised to said transducer input during a first set of time intervals, means for applying an optical image of a second and different portion of said scene to said transducer input during a second set of time intervals, said first optical image containing more detail information than said second image, said transducing means thereupon producing first and second electrical signals corresponding to said applied optical images, first and second means responsive to said first and second signals respectively for producing a composite luminous image composed of first and second luminous image portions whose detail corresponds respectively to said first and second signals, said first and second image portions being constituted and arranged to reproduce collectively the geometrical and positional characteristics of all of the elements of the first and second portions of said scene with fidelity.

3. The system according to claim 2 wherein said first and second portions include alternative field information of said scene.

4. The system according to claim 2 wherein said first portion of said scene is the central portion thereof, and wherein said second portion of said scene is the remaining portion thereof.

5. The system according to claim 2 wherein said means for applying first image portion to said transducing means includes optical magnifying means and wherein said first luminous image reproducing means includes optical condensing means.

6. A television system comprising: a television camera, means for applying to said camera during a first set of time intervals a first optical image corresponding to the central portion of a scene to be televised, means for applying to said camera during a second set of time intervals alternating with said first set a second optical image corresponding to the remaining portion of said televised scene, said first optical image being magnified more than said second optical image, said television camera producing in response to said images applied thereto a train of corresponding first and second signals, a transmission path to which said first and second signals are applied, switching means coupled to said path and adapted to receive said first and second signals, first and second luminous-image producing display means coupled to said switching means, said switching means being constructed and arranged to apply said first signal to said first display means and said second signal to said second display means in alternate time intervals whereupon said first and second display means produce corresponding first and second luminous images, optical combining means in the optical paths of said first and second display means, and means in the optical path between said first display means and said combining means for optically reducing said first image to a predetermining size, said combining means and said optical reducing means being constructed to present to a viewer a composite image composed of said first and second luminous images integrated to form a composite image which faithfully reproduces the geometric and positional characteristics of the elements of said televised scene.

7. A television transmitter comprising: means for developing a first electrical signal corresponding to the central portion of a scene to be televised, and means for developing a second electrical signal corresponding to the remaining outer portion of said scene, said first signal-developing means being constructed and arranged so that said first signal includes more detail information than said second signal.

8. A television receiver system for producing a composite image comprising: means for producing a first luminous image in response to a first electrical signal corresponding to the central portion of a scene to be televised, means for producing a second luminous image in response to a second electrical signal corresponding to the remaining outer portion of said scene, said first signal including more detail information than said second signal and said first luminous image containing more detail than said second image, and means for combining said first and second luminous images into a composite image wherein said first image fits in the center of said second image substantially imperceptibly, said first and second image portions of said composite image reproducing the positional and geometric characteristics of the elements of said scene faithfully.

9. A television transmitter comprising: a single transducing means for converting light input to electrical signal output, means for applying an optical image of a first portion of a scene to be televised to said transducer input during a first set of time intervals, and means for applying an optical image of a second and different portion of said scene to said transducer input during a second set of time intervals, said first optical image containing more detail information than said second image, said transducing means thereupon producing first and second electrical signals corresponding to said applied optical images.

10. The transmitter according to claim 9 wherein said first portion of said scene is the central portion thereof and wherein said second portion of said scene is the remaining portion thereof.

11. A television receiver comprising: first means for producing a first luminous image portion in response to a first electrical signal corresponding to a first optical image of a first portion of a televised scene, second means for producing a second luminous image portion in response to a second electrical signal corresponding to a second optical image of a second and different portion of said scene, said first signal and said first luminous image portion containing more detail information than said second signal and said second luminous image portion, and means for combining said first and second luminous image portions to produce a composite image wherein said first and second image portions reproduce collectively the geometrical and positional characteristics of all the elements of the first and second portions of said scene with fidelity.

12. The receiver according to claim 11 wherein said combining means includes optical means for condensing said first luminous image portion.

13. A television transmitter comprising a television camera tube having a photo-cathode, a lens system for focusing the scene to be televised on the photo-cathode of said camera tube, said lens system providing first and second optical paths of different magnification, said second path providing greater image magnification than said first path, mechanically operable means for causing said scene to be focussed on said photo-cathode by way of said first optical path during a first set of time intervals and for causing said scene to be focussed on said photo-cathode by way of said second optical path during a second set of time intervals, means for excluding from the output signal of said camera tube during said first set of time intervals signals representative of the scene imaged on said photo-cathode during said second set of time intervals whereby the signals produced during said first set of time intervals and said second set of time intervals represent contiguous, non-overlapping areas of the scene to be televised.

14. A television transmitter in accordance with claim 13 wherein said mechanically operable means for rendering said first and second optical paths effective comprises a mechanical shutter intercepting said first and second optical paths, said shutter being formed with a cut-out portion which is caused to be in registry with said first optical path during said first set of time intervals and in registry with said second optical path during said second set of time intervals.

15. A transmitter in accordance with claim 13 wherein said means for excluding from the output signal of said camera tube during said first set of time intervals signals representative of the scene imaged on said photocathode during said second set of time intervals comprises an optical mask positioned in said first optical path.

References Cited in the file of this patent

UNITED STATES PATENTS

| | | |
|---|---|---|
| 2,490,561 | Ussler | Dec. 6, 1949 |
| 2,629,010 | Graham | Feb. 17, 1953 |
| 2,700,700 | De France | Jan. 25, 1955 |
| 2,774,964 | Baker | Dec. 18, 1956 |

OTHER REFERENCES

Publication: "Spiral Televison Scanning," Feldman and Yudich Radio Engineering (Russian); Vol. 12, No. 3, 1957; pp. 33 to 40.